(12) United States Patent
Eickeler et al.

(10) Patent No.: US 10,412,322 B2
(45) Date of Patent: Sep. 10, 2019

(54) METHOD OF REPLACING IMAGE CONTENT

(71) Applicant: Fraunhofer-Gesellschaft zur Förderung der angewandten Forschung e.V., München (DE)

(72) Inventors: Stefan Eickeler, Bonn (DE); Ronja Möller, Bonn (DE); Ulrich Nütten, Bonn (DE); Rainer Wollsiefen, Bonn (DE); Wolfgang Vonolfen, Bonn (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 30 days.

(21) Appl. No.: 15/886,369

(22) Filed: Feb. 1, 2018

(65) Prior Publication Data

US 2018/0220084 A1    Aug. 2, 2018

(30) Foreign Application Priority Data

Feb. 2, 2017 (EP) .................................. 17154482
Mar. 31, 2017 (EP) .................................. 17164241

(51) Int. Cl.
*H04N 5/272* (2006.01)
*G06Q 30/02* (2012.01)
*G06T 7/90* (2017.01)
*H04N 9/75* (2006.01)

(52) U.S. Cl.
CPC ....... *H04N 5/2723* (2013.01); *G06Q 30/0261* (2013.01); *G06Q 30/0276* (2013.01); *G06T 7/90* (2017.01); *H04N 9/75* (2013.01)

(58) Field of Classification Search
CPC .......... H04N 5/2723; H04N 9/75; G06T 7/90; G06Q 30/0261; G06Q 30/0276
See application file for complete search history.

(56) References Cited

U.S. PATENT DOCUMENTS

| 5,093,717 A * | 3/1992 | Sandrew ............... G06T 11/001 |
| | | 348/34 |
| 5,398,075 A | 3/1995 | Freytag et al. |
| 2008/0273794 A1* | 11/2008 | Samworth ................ H04N 1/54 |
| | | 382/167 |

FOREIGN PATENT DOCUMENTS

| GB | 2312348 A * | 10/1997 | ............... H04N 9/75 |
| GB | 2312348 A | 10/1997 | |
| WO | WO-2007097517 A1 | 8/2007 | |
| WO | WO-2012038009 A1 | 3/2012 | |

OTHER PUBLICATIONS

"European Application Serial No. 17164241.6, Extended European Search Report dated Nov. 7, 2017", (Nov. 7, 2017), 9 pgs.

* cited by examiner

*Primary Examiner* — Yu Chen
(74) *Attorney, Agent, or Firm* — Schwegman Lundberg & Woessner, P.A.

(57) ABSTRACT

A method of replacing graphical content in images of a scene recorded by a camera, wherein the graphical content to be replaced is an image of at least one feature in the scene whose color represents one or more primary colors. The graphical content to be replaced is replaced by replacing content in accordance with a gray scale mask in the image recorded by the camera.

18 Claims, 3 Drawing Sheets

METHOD OF REPLACING IMAGE CONTENT

CLAIM FOR PRIORITY

This application claims the benefit of priority to European Application No. 17 154 482.8, filed Feb. 2, 2017 and to European Application No. 17 164 241.6, filed Mar. 31, 2017, which are hereby incorporated by reference in their entireties.

TECHNICAL FIELD

This document pertains generally, but not by way of limitation, to graphical content. More particularly, this disclosure relates to a method for replacing graphical content in images.

BACKGROUND

On the international transmission of sports events or other events, the virtual replacement of existing advertising spaces with national versions has a great market potential. An important condition is that according to current law no additional advertising spaces may normally be added. The virtual advertising may therefore only replace visible advertising. This represents a difficult problem in common contexts.

A solution for replacing pitch-perimeter advertising is described in WO 2012/038009. A monochrome advertising space is detected here using a code in the camera image. The replacing banner content can be rendered while using the dimensions of the detected advertising area and the rendered banner content can be combined with the image of the camera by chroma keying with a measured chromaticity.

The solution of WO 2012/038009 requires an encoding of the banner image.

SUMMARY

The present subject matter relates to a method of replacing graphical content in images of a scene recorded by a camera, wherein the graphical content to be replaced is an image of at least one feature in the scene whose color represents one or more primary colors.

The present subject matter provides a method of replacing graphical content in images of a scene recorded by a camera, said method being able to replace the graphical content in images recorded by a camera without these pieces of content requiring any characterization going beyond the actual graphical content.

This is achieved by the method of replacing at least one piece of graphical content to be replaced with at least one piece of replacing graphical content in accordance with claim 1. The dependent claims set forth advantageous further developments of the method in accordance with claim 1.

In accordance with the present subject matter, a method is provided of replacing at least one piece of graphical content, that will here be called the graphical content to be replaced, with at least one piece of graphical content, that will here be called the replacing graphical content, in at least one image of a scene recorded by a camera. The camera here can advantageously be an electronic camera that converts light incident into its lens into electrical signals by means of an electronic image sensor such as a CCD sensor or a CMOS sensor.

In accordance with the present subject matter, the at least one piece of graphical content to be replaced is an image of at least one feature in the scene. The image here is the image of the feature in the scene produced by the camera. The feature in the scene can, for example, be a banner in a stadium so that the graphical content that is the image of the banner is the representation of the banner in the image recorded by the camera.

The method in accordance with the present subject matter starts from the premise that the feature in the scene is in color, with its colors only being primary colors at least in that region that is to be replaced in the image of the camera. The feature can in particular be composed of a plurality of monochrome regions, with the regions each having exactly one primary color. The restriction of the content to be replaced to primary colors means a certain restriction for the design of, for example, banner graphics; on the other hand, banner advertising in a number of countries is anyway restricted to a few colors and a number of sports also require banner advertising having only a few colors since otherwise, for example, the recognizability of the ball would be impaired, in tennis for example.

Primary colors are here understood as the colors red, green, blue, cyan, magenta, and yellow. A color can advantageously be represented as an RGB tuple having values between 0.0 and 1.0. The primary colors are then those colors in which the RGB triple either contains 0.0 twice and 1.0 once or 0.0 once and 1.0 twice. The restriction to these six colors enables an easier recognition in the image in comparison with other colors since they are located in the corners of the RGB color cube. However, this does not mean that the coloring of the object in the scene has, for example, to be a one hundred percent pure primary color. This depends on the light conditions of the real scene and on the color settings of the recording camera (installed color matrix chip, results of the color balance prior to production, aperture settings, or also on the exposure times used during production). The exact selection of the color in the recorded image should ultimately be as close as possible to one of the primary colors. It is equally conceivable to obtain a different color cube than RGB by using a chip having different color sensitivities in the camera and thereby to enable a combination of other colors than the six colors named above. In this case, these other colors would be considered primary colors.

In accordance with the present subject matter, in a first step, a respective intensity mask is now produced for at least those primary colors that are colors of the feature. If the feature therefore has one or more of the primary colors, an intensity mark is thus generated in the first step for each of the primary colors. The intensity mask can always be produced for all six primary colors; it is, however, in principle sufficient to produce the intensity mask only for those primary colors that actually occur in the feature, provided it is provided in advance.

In a second step subsequent to the first step a gray scale mask is then calculated from all the intensity masks produced in the first step. In a simple case, for example, the gray scale mask can simply be the weighted sum of the intensity masks.

The content to be replaced can then be replaced by the replacing content in the image recorded by the camera in accordance with the gray scale mask. Different options exist here as to how the gray scale mask can be used to replace the content to be replaced with the replacing content. In a simple example, the gray scale mask can be interpreted as a transparent mask so that each gray scale is interpreted as transparency. The replacing piece of graphical content can then be placed behind the camera image and the camera image can be made transparent in accordance with the gray scale mask or the transparent mask so that the higher the value of the transparency in a specific pixel, the larger the portion of the piece of replacing graphical content at the created image.

The feature can preferably have the colors green and magenta or red and blue. This is in particular preferred if the camera sensor has a Bayer pattern since two respective pixels of four color sensors are green, one is blue, and one is red in said Bayer pattern. If the feature has said colors green and magenta or red and blue, they are recorded by a camera sensor having a Bayer pattern with the same intensity.

Masks in which each pixel has a specific value are called intensity masks and gray scale masks here. Pixels of the masks here correspond to pixels of the recorded camera image. The masks can therefore be calculated pixel-wise from the values of the pixels of the camera image. It is generally not necessary that the masks extend over the total recorded camera image. It can also be sufficient for the masks only to be produced or calculated for those regions of the recorded camera image in which the feature is actually imaged or is to be expected. This can be achieved, for example, by use of a camera tracking with whose aid the feature imaging in the image can be predicted to a certain degree. The masks can, however, also each be produced for the total image recorded by the camera.

In an example, the intensity masks can be produced in the first step at least for those primary colors that are colors of the at least one feature in that respective intensity values $E_{color}$ are produced for the pixels of at least that region of the image of the camera that is to be observed, with the index "color" designating the colors red, green, blue, cyan, magenta, or yellow. The following intensity value can be calculated for every pixel in this embodiment:

$$E_{red}=\max(0,R-\max(G,B))$$

$$E_{green}=\max(0,G-\max(R,B))$$

$$E_{blue}=\max(0,B-\max(R,G))$$

$$E_{cyan}=\max(0,\min(G,B)-R)$$

$$E_{magenta}=\max(0,\min(R,B)-G)$$

$$E_{yellow}=\max(0,\min(R,G)-B).$$

Here, R is a red portion; G is a green portion; and B is a blue portion of the observed pixel. These intensity masks can be calculated for all six primary colors or only for those primary colors that actually occur in the feature.

In an example, the gray scale mask can be calculated from the calculated intensity masks $E_{color}$ in that a gray scale E is calculated as follows for each pixel of the observed region of the image:

$$E=f_{red}*E_{red}+f_{green}*E_{green}+f_{blue}*E_{blue}+f_{cyan}*E_{cyan}+f_{magenta}*E_{magenta}+f_{yellow}*E_{yellow}.$$

In an alternative example, the gray scale mask can also be calculated in that the respective gray scale E is calculated as follows for the pixels of the region of the image from the intensity values $E_{color}$:

$$E=\max(f_{red}*E_{red},f_{green}*E_{green},f_{blue}*E_{blue},f_{cyan}*E_{cyan},f_{magenta}*E_{magenta},f_{yellow}*E_{yellow}).$$

In both alternatives, $f_{red}$, $f_{green}$, $f_{blue}$, $f_{cyan}$, $f_{magenta}$, $f_{yellow}$ are weighting factors by means of which amounts of those colors can be removed from the gray scale mask of which do not occur in the feature. This can be done in that the corresponding weighting factor f is set to zero.

In an example, the weighting factors $f_{color}$ can be fixed in a prior calibration step. The scenery can be recorded by the camera here such that the image of the at least one feature only has those primary colors that are colors of the feature. The scene can be recorded under ideal lighting or under ideal conditions. The weighting factors can then be fixed such that the weighted intensities that occur in the feature are evenly distributed.

One of the primary colors can, for example, be recorded less intensely or less purely in comparison with another primary color in dependence on the light conditions in the real scene or camera settings (color matrix, color balance, aperture, etc.) and can thus cause smaller values in the intensity mask, which inter alia leaves contours of the transitions between the two primary colors in the gray scale mask. The aim of the calibration is the balance of such differences so that all the colors that arise in the graphical content to be replaced are keyed the same. As a consequence, the chroma keyer can then be further set via a single regulator for all primary colors together.

A calibration can take place, for example, via the recording of the feature in the scene in the camera image in a frontal, image-filling manner with all the primary colors that occur and with a uniform lighting. The different intensity averages of all colors over all the pixels showing the feature are then weighted correspondingly conversely for balance (i.e. a higher intensity average of a primary color in comparison with a different primary color produces a smaller weighting factor).

In an example, the gray scale mask can be used to perform an object recognition in the gray scale mask. Which region of the image recorded by the camera images the at least one feature of the scene can be determined by the object recognition. An average of the corresponding color over all the pixels within the image of the feature can then advantageously be formed for each of the primary colors that occur in the feature. The color values of some or all of the pixels that lie in the image of the feature can therefore be added and can be divided by the number of these pixels. The average primary color obtained in this manner can advantageously be used to replace the content to be replaced by means of chroma keying with the replacing content independently of light conditions or of camera settings.

On the use of a chroma key process, for example as described in [Keith Jack, Video Demystified—A Handbook for the Digital Engineer, Elsevier 2007, ISBN: 978-0-7506-8395-1], a slightly modified main axis of the key color thereby results. The field 13 highlighted in gray in FIG. 3 describes all the magenta color shades in the color circle according to this process that result in transparencies and thus in replacements. A slight adaptation of the key axis from magenta to magenta' is obtained with the average primary color. Everything in the region 13 is considered as 100% transparent.

If an object recognition was carried out in this manner for determining the feature in the image of the camera, the chroma keying can advantageously be limited to that region of the image that images the feature or to a region of which the image of the feature is a part region. A finely parameterized chroma keying can then advantageously be used that operates in the chrominance plane of the YCbCr color space.

The method can be carried out in single images or in still images. Preferably, however, contents in video sequences are replaced. The at least one image recorded by the camera can then be a frame of such a moving image. The method described can be carried out again for each frame here.

In an example, however, the described average of the color values of the pixels can also be formed over a plurality of consecutive frames. In this case, the color values of the corresponding pixels are therefore summed over a plurality of frames and are divided by the number of pixels multiplied by the number of frames observed. This calculation rule can differ in dependence on the situation if, for example, a fast flash pan causes the image contents to jump too abruptly as a consequence.

BRIEF DESCRIPTION OF THE DRAWINGS

The present subject matter will be explained in the following with reference to some Figures. The features described in the examples can here be implemented independently from the specific example and can be combined among the examples.

There is shown.

DETAILED DESCRIPTION

Figure 1:
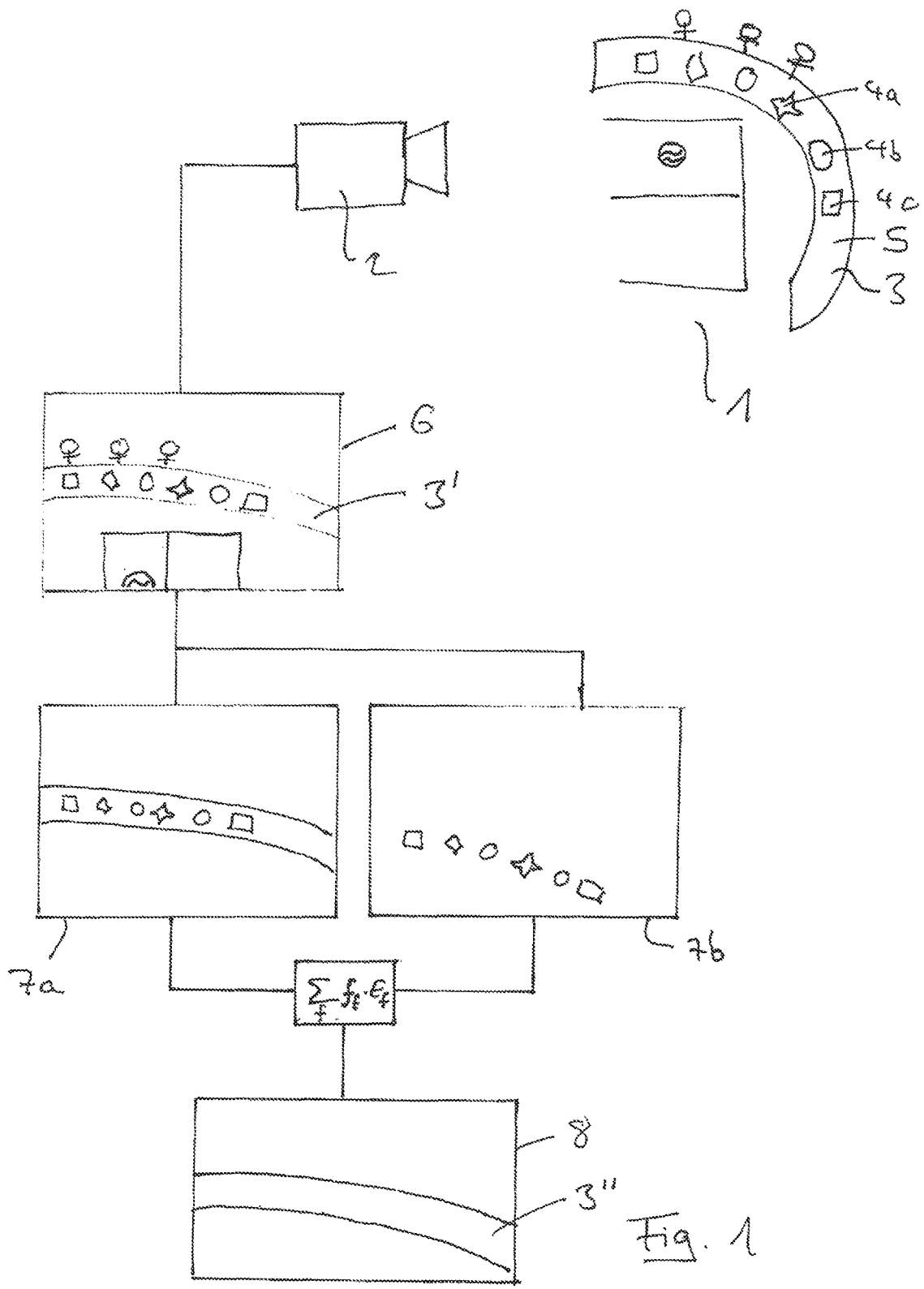
FIG. 1 is a block diagram of a routine of a method up to the calculation of a gray scale mask.

In the example of the method shown in FIG. 1, an image or an image sequence of a scene 1 is first recorded by means of a camera 2. The scene 1 here includes at least one feature 3, here a banner 3 whose colors are primary colors.

It will be assumed in the following that the banner 3 shows blue FIGS. 4a, 4b, 4c on a red background 5. Other features of the scene that are not to be replaced comprise persons, a sports field, and a ball, for example.

The camera 2 produces a camera image 6 of the scene 1, for example by means of an electronic sensor. The camera image 6 shows an image 3' of the feature 3 and images of the other features of the scene 1. The method should now replace the image 3' of the feature 3 as the graphical content to be replaced with a piece of replacing graphical content.

For this purpose, an intensity mask 7a and 7b is produced in a first step at least for each primary color that is a color of the feature, that is at least for red and for blue in the example shown. The intensity mask 7a is here the intensity mask for the color red of the background 5 and 7b is the intensity mask for the color blue of the foreground 4a, 4b, 4c. The intensity masks 7a, 7b can here be produced for all the primary colors or for those that occur in the content 3' to be replaced. The intensity values $E_{color}$ can be calculated using the following formulas:

$$E_{red}=\max(0,R-\max(G,B))$$

$$E_{green}=\max(0,G-\max(R,B))$$

$$E_{blue}=\max(0,B-\max(R,G))$$

$$E_{cyan}=\max(0,\min(G,B)-R)$$

$$E_{magenta}=\max(0,\min(R,B)-G)$$

$$E_{yellow}=\max(0,\min(R,G)-B)$$

Here R is a red value; G is a green value; and B is a blue value of the image 6 of the camera 2 in the corresponding pixel. The intensity values $E_{color}$ can be determined for all the pixels of the image 6 in the example shown. It is, however, also possible to restrict this determination to a part region of the image 6 of which the feature 3' to be replaced is completely present in it. Such a prior knowledge can, for example, be generated on the use of camera tracking.

A gray scale mask 8 can now be calculated from the intensity masks 7a and 7b in that a gray value E is calculated for each pixel as $$E=f_{red}*E_{red}+f_{green}*E_{green}+f_{blue}*E_{blue}+f_{cyan}*E_{cyan}+f_{magenta}*E_{magenta}+f_{yellow}*E_{yellow}$$

or alternatively as $$E=\max(f_{red}*E_{red},f_{green}*E_{green},f_{blue}*E_{blue},f_{cyan}*E_{cyan},f_{magenta}*E_{magenta},f_{yellow}*E_{yellow}),$$

where $f_{red}$, $f_{green}$, $f_{blue}$, $f_{cyan}$, $f_{magenta}$, $f_{yellow}$ are weighting factors for the respective colors. In the gray scale mask, those pixels have a value differing from zero at which one of the keying colors, i.e. of the primary colors, that occur in the feature is present in the image 6 recorded by the camera. By setting the prior factors f to zero, those colors can be set as non-contributory in advance of which they do not occur in the graphical content to be replaced.

It is generally possible to consider the gray scale mask 8 as a transparency mask 8 and to carry out a keying with it, with those pixels having high values or high gray values having a high transparency. The gray scale can be considered as the same as the transparency value or as proportional to the transparency value. The regions can equally be set with complete transparency, with complete coverage, or with a transition thereof. This means that regions having complete transparency or 100% replacement are associated with maximum intensity and regions without transparency or without replacement are associated with zero transparency. Between these values, the association can take place proportionally, preferably with color correction. The determination of the respective limit values can take place, as also already for the weighting functions f, in a calibration step in that, for example, the frequency distribution of the intensities of a primary color is analyzed.

Figure 2:
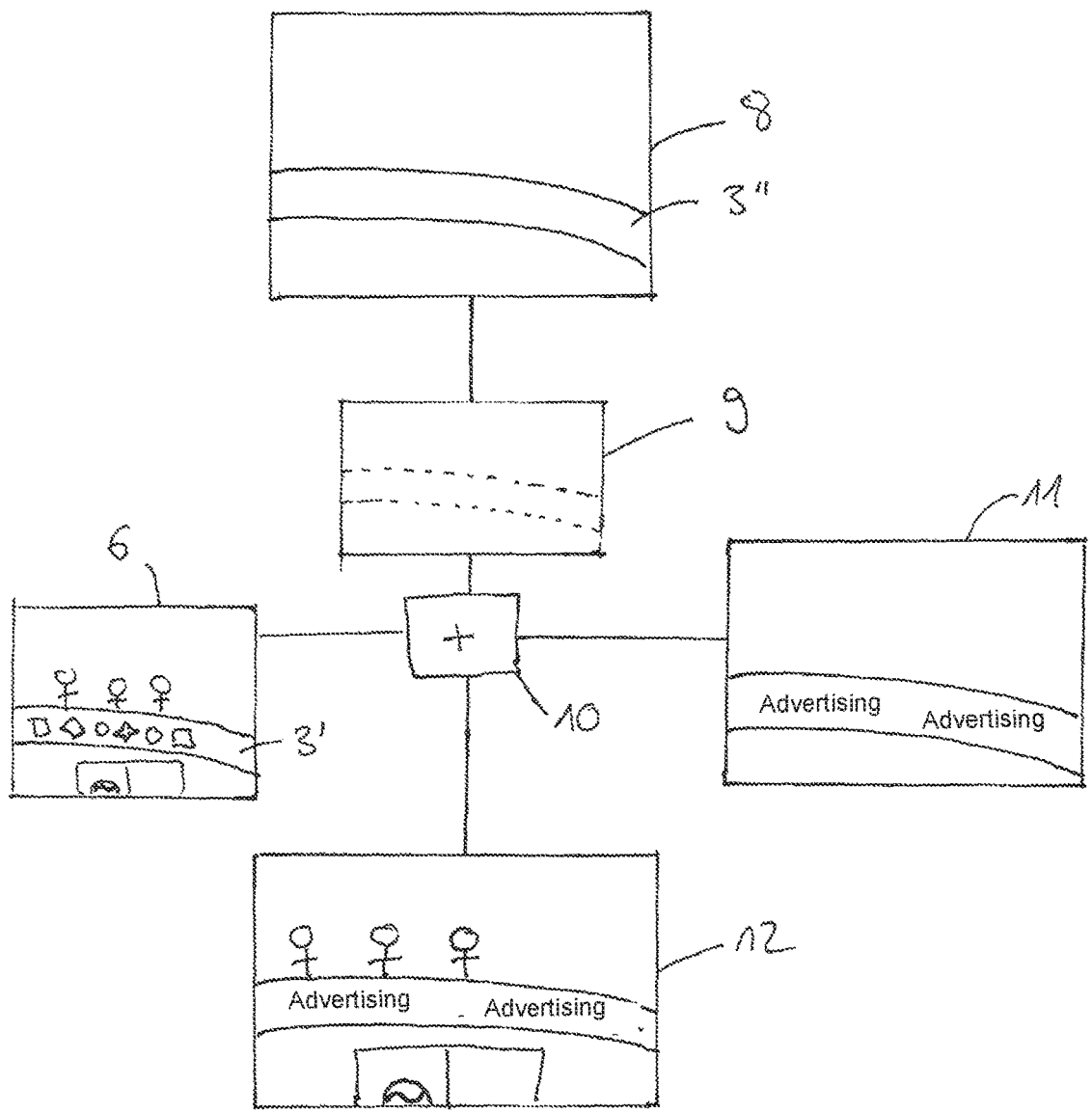
FIG. 2 is a block diagram of a routine of a method for replacing a graphical content to be replaced with a piece of replacing graphical content starting from the gray scale mask.
Figure 3:
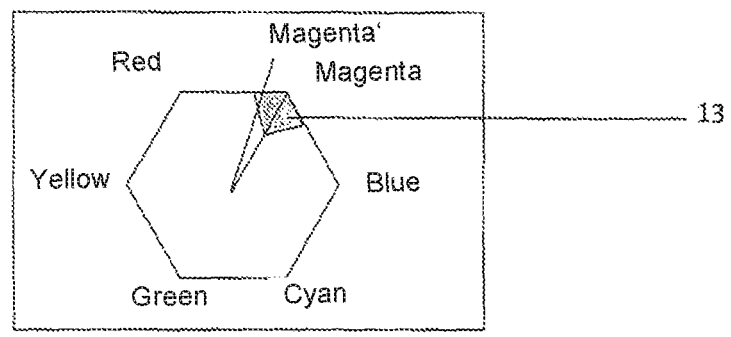
FIG. 3 is an arrangement of the primary colors in a diagram in which the color palette has been added. The 6 corners correspond to the primary colors.

Advantageously, however, the gray scale mask 8 as shown in FIG. 2 is used to perform an object recognition in the gray scale mask 8 on the region of the presence of the image of feature 3', that is marked as 3" in FIGS. 1 and 2. The object recognition step 9 for recognizing the object 3" (shown dashed in step 9) in the gray scale mask 8 produces knowledge of those pixels of the gray scale mask 8 at which the banner 3' is present in the image 6 recorded by the camera 2.

After carrying out the object recognition, for those primary colors occurring in the content 3' to be replaced a respective average value of these primary colors can now be determined in step 9 for those pixels that were identified as belonging to the content 3'. These average primary colors can then be used in step 10 to replace by means of chroma keying the content 3' to be replaced with the replacing content 11 in the image 6 recorded by the camera to produce an output image 12.

The replacing content 11 can for this purpose preferably be converted via zooming, panning, etc. of the camera 2 such that its perspective properties agree with the content to be replaced in the camera image 6 of the original scene. This perspective adaptation of the replacing content can take place using the perspective distortion of the content to be replaced in the recorded image, using sensor values of a camera tracking, using a combination of pre-knowledge on the scenery with recognized properties of the feature in the camera image, or also using a combination of the above.

The claimed invention is:

1. A method of replacing at least one piece of graphical content to be replaced with at least one piece of replacing graphical content in at least one image of a scene recorded by a camera, wherein the at least one piece of graphical content to be replaced is an image of at least one feature in the scene, with a color or colors of the at least one feature being at least one primary color, the method comprising:
in a first step, producing a respective intensity mask at least for every primary color that is a color of the at least one feature;
in a second step, calculating a gray scale mask from intensity masks produced in the first step;
and replacing the at least one piece of graphical content to be replaced with the at least one piece of replacing graphical content in accordance with the gray scale mask, in the at least one image recorded by the camera,
wherein, in the first step, producing the respective intensity mask at least for every primary color that is a color of the at least one feature comprises calculating, for pixels of at least one region of the at least one image of the camera, respective intensity values $E\text{red} = \max(0, R - \max(G, B))$, $E\text{green} = \max(0, G - \max(R, B))$, $E\text{blue} = \max(0, B - \max(R, G))$, $E\text{cyan} = \max(0, \min(G, B) - R)$, $E\text{magenta} = \max(0, \min(R, B) - G)$, and $E\text{yellow} = \max(0, \min(R, G) - B)$;

with quantity R being a red value, quantity G being a green value, and quantity B being a blue value of the at least one image of the camera in a corresponding pixel;
wherein, in the second step, calculating the gray scale mask comprises calculating a respective gray scale $E = f\text{red}*E\text{red} + f\text{green}*E\text{green} + f\text{blue}*E\text{blue} + f\text{cyan}*E\text{cyan} + f\text{magenta}*E\text{magenta} + f\text{yellow}*E\text{yellow}$ for the pixels of the at least one region of the at least one image of the camera from the respective intensity values,
with quantities fred, fgreen, fblue, fcyan, fmagenta, and fyellow being weighting factors.

2. The method of claim 1, wherein the at least one feature has the colors green and magenta or red and blue.

3. The method of claim 1, wherein the weighting factors of those colors that are not present in a feature area set is equal to zero.

4. The method of claim 1, wherein the weighting factors are fixed in a prior calibrating step in which the scene is recorded with the camera such that the image of the at least one feature only has those primary colors that are colors of the at least one feature and the weighting factors are fixed such that colors of the at least one feature have an equal intensity distribution on a use of the respective weighting factor.

5. The method of claim 1, further comprising:
performing an object recognition in the gray scale mask to determine which region of the at least one image recorded by the camera images the at least one feature of the scene; and
calculating a respective average of the corresponding color of pixels that are part of the region that images the at least one feature for those primary colors that are colors of the at least one feature; and
replacing the at least one piece of replacing graphical content by chroma keying on the calculated averages of the primary colors.

6. The method of claim 5, wherein the chroma keying is only performed in the region of the at least one image that is determined as belonging to the at least one image of the at least one feature.

7. The method of claim 1, wherein the camera is a video camera that records a plurality of frames and the method is carried out for each of the plurality of frames.

8. The method of claim 5, wherein the respective average is calculated over a plurality of consecutive frames.

9. The method of claim 3, wherein the weighting factors are fixed in a prior calibrating step in which the scene is recorded with the camera such that the image of the at least one feature only has those primary colors that are colors of the at least one feature and the weighting factors are fixed such that all the colors that are colors of the at least one feature have an equal intensity distribution on a use of the respective weighting factor.

10. The method of claim 7, wherein the respective average is calculated over a plurality of consecutive frames.

11. A method of replacing at least one piece of graphical content to be replaced with at least one piece of replacing graphical content in at least one image of a scene recorded by a camera, wherein the at least one piece of graphical content to be replaced is an image of at least one feature in the scene, with a color or colors of the at least one feature being at least one primary color, the method comprising:
in a first step, producing a respective intensity mask at least for every primary color that is a color of the at least one feature;
in a second step, calculating a gray scale mask from intensity masks produced in the first step;
and replacing the at least one piece of graphical content to be replaced with the at least one piece of replacing graphical content in accordance with the gray scale mask, in the at least one image recorded by the camera,
wherein, in the first step, producing the respective intensity mask at least for every primary color that is a color of the at least one feature comprises calculating, for pixels of at least one region of the at least one image of the camera, respective intensity values $E\text{red} = \max(0, R - \max(G, B))$, $E\text{green} = \max(0, G - \max(R, B))$, $E\text{blue} = \max(0, B - \max(R, G))$, $E\text{cyan} = \max(0, \min(G, B) - R)$, $E\text{magenta} = \max(0, \min(R, B) - G)$, and $E\text{yellow} = \max(0, \min(R, G) - B)$;

with quantity R being a red value, quantity G being a green value, and quantity B being a blue value of the at least one image of the camera in a corresponding pixel;

wherein, in the second step, calculating the gray scale mask comprises calculating a respective gray scale $$E = \max(fred*Ered, fgreen*Egreen, (blue*Eblue, fcyan*Ecyan, fmagenta*Emagenta, fyellow*Eyellow)$$

for the pixels of the at least one region of the at least one image of the camera from the respective intensity values, with quantities fred, fgreen, fblue, fcyan, fmagenta, and fyellow being weighting factors.

12. The method of claim 11, wherein the weighting factors of those colors that are not present in a feature area set is equal to zero.

13. The method of claim 11, wherein the weighting factors are fixed in a prior calibrating step in which the scene is recorded with the camera such that the image of the at least one feature only has those primary colors that are colors of the at least one feature and the weighting factors are fixed such that all the colors that are colors of the at least one feature have an equal intensity distribution on a use of the respective weighting factor.

14. The method of claim 11, wherein the at least one feature has the colors green and magenta or red and blue.

15. The method of claim 11, further comprising:
performing an object recognition in the gray scale mask to determine which region of the at least one image recorded by the camera images the at least one feature of the scene; and
calculating a respective average of the corresponding color of pixels that are part of the region that images the at least one feature for those primary colors that are colors of the at least one feature; and
replacing the at least one piece of replacing graphical content by chroma keying on the calculated averages of the primary colors.

16. The method of claim 15, wherein the chroma keying is only performed in the region of the at least one image that is determined as belonging to the at least one image of the at least one feature.

17. The method of claim 11, wherein the camera is a video camera that records a plurality of frames and the method is carried out for each of the plurality of frames.

18. The method of claim 15, wherein the respective average is calculated over a plurality of consecutive frames.

* * * * *